350-96.15     SR
9/17/85     XR     4,541,159

United States Patent [19]
Michel et al.

[11] Patent Number: 4,541,159

[45] Date of Patent: Sep. 17, 1985

[54] METHOD FOR MANUFACTURING LIGHT WAVEGUIDE BRANCHES AND MULTI/DEMULTIPLEXERS ACCORDING TO THE BEAM DIVIDER PRINCIPLE

[75] Inventors: Herbert Michel; Walter Rauscher, both of Munich; Achim Reichelt, Unterhaching, all of Fed. Rep. of Germany

[73] Assignee: Siemens Aktiengesellschaft, Berlin & Munich, Fed. Rep. of Germany

[21] Appl. No.: 511,840

[22] Filed: Jul. 8, 1983

[30] Foreign Application Priority Data

Sep. 29, 1982 [DE] Fed. Rep. of Germany ....... 3236149

[51] Int. Cl.[4] .......................... B23P 17/00; G02B 5/14
[52] U.S. Cl. ..................................... 29/418; 350/96.15
[58] Field of Search ............ 29/418; 350/96.15, 96.16, 350/96.17

[56] References Cited
U.S. PATENT DOCUMENTS

| | | | |
|---|---|---|---|
| 3,820,396 | 3/1975 | Racki et al. | 350/96.16 |
| 4,317,699 | 3/1982 | Winzer et al. | 350/96.15 |
| 4,325,605 | 4/1982 | Winzer et al. | 350/96.15 |
| 4,336,047 | 6/1982 | Paulopoulos et al. | 350/96.15 |
| 4,339,290 | 7/1982 | Winzer et al. | 350/96.16 |

FOREIGN PATENT DOCUMENTS

3012184 8/1981 Fed. Rep. of Germany .

OTHER PUBLICATIONS

Winzer et al., "Single-Mode and Multimode All-Fiber Directional Couplers for WDM", *Applied Optics*, vol. 20, No. 18, Sep. 15, 1981, pp. 3128–3135.

*Primary Examiner*—Howard N. Goldberg
*Assistant Examiner*—Steven Nichols
*Attorney, Agent, or Firm*—Hill, Van Santen, Steadman & Simpson

[57] ABSTRACT

A method for manufacturing light waveguide branch elements and multi/demultiplexer elements, which elements operate in accordance with the beam divider principle by providing a first body having a plurality of parallel extending waveguides adjacent one side thereof, cutting the body at an angle to the waveguides to form two parts, after preparing the cut surfaces of the parts, applying a mirror or filter structure onto one of the polished surfaces and reassembling the parts to form an assembly, and forming an element by subsequently positioning and securing a second body on the assembly with the second body having light waveguides extending to one surface and the end faces of the waveguides of the one surface being adjacent to the mirror or filter structure so that light traveling in the waveguides of the first assembly will be reflected into the waveguides of the second body.

10 Claims, 9 Drawing Figures

METHOD FOR MANUFACTURING LIGHT WAVEGUIDE BRANCHES AND MULTI/DEMULTIPLEXERS ACCORDING TO THE BEAM DIVIDER PRINCIPLE

BACKGROUND OF THE INVENTION

The present invention is directed to a method of manufacturing light waveguide branch elements and multi/demultiplexer elements, which elements operate in accordance with the beam dividing principle. The method includes providing a first body having a plurality of parallel extending light waveguides at a given spacing disposed along one side or surface thereof, cutting the first body into two sub-bodies or parts, polishing the cut surfaces, applying a reflective structure to one of the polished cut surfaces, reassembling the two parts into an assembly with the waveguide being axially aligned and the reflective structure disposed therein, providing a second body having a polished surface with parallel extending waveguides at said spacing and having polished end faces terminating in said polished surface, assembling the body on the assembly with the polished surface facing the one surface and the polished end faces of the second waveguides being in the proximity of the reflective structure to receive light reflected thereby, and securing the bodies in said assembled position to form the element so that the light traveling in the first waveguide is reflected by the reflective structure coupled into the ends of the second waveguide.

Methods are known for forming branch elements or multi/demultiplexer elements, which elements operate in accordance with the beam divider principle. Examples of these methods are disclosed in U.S. Pat. No. 4,339,290, which claims priority from German application No. 2,920,957, from copending U.S. patent application Ser. No. 246,100, filed Mar. 20, 1981, which claims priority from German application No. 3,012,184 and from an article from *Applied Optics*, Vol. 20, 1981, p. 3128. In the methods disclosed in these above mentioned references, the first body having a plurality of parallel extending waveguides on one surface is provided and so is a second body which has a plurality of waveguides whose end faces are terminated on a surface of the body. The second body is then assembled on the one surface of the first body with the waveguides of the second body being aligned with the waveguides of the first body and then the two bodies are joined together such as by cementing. The next method step is to produce a filter or mirror which occurs by cutting the assembled bodies along a plane extending at an angle of 45° or 70° relative to the axes of the fibers of the first body. The cut surface of one of the cut parts will also exhibit the light waveguide of the second body and must be very carefully ground and polished so that after applying a reflective structure, which can be either a partially reflective mirror or a wavelength selective filter, and the joining of the two parts back together, light traveling in the waveguides of the first body and reflected by the mirror will be coupled into the waveguides of the second body. The work step of positioning the cutting step and polishing the cut surfaces is very time-consuming and is critical. In many instances, improper polishing or over-polishing of the cut surfaces will render the branch elements defective.

SUMMARY OF THE INVENTION

The present invention is directed to an improved method of producing branch elements and/or multi/demultiplexer elements, wherein the time-consuming step of grinding and polishing of the one cut surface which is so critical in terms of yield for the elements is eliminated.

To achieve this object, the present invention is directed to a method for manufacturing light waveguide branch elements and multi/demultiplexer elements, which elements operate according to the beam divider principle, said method comprising the steps of providing a first body having parallel extending first light waveguides at a given spacing disposed along one side thereof; cutting said first body along a plane forming an angle with the first waveguides to form two parts; polishing the cut surfaces; applying a reflective structure on one of the polished surfaces, said reflective structure consisting of material selected from a group of materials forming a partial mirror and materials for forming filters; reassembling and joining said parts together to form an assembly with the waveguides of each of the parts being axially aligned and the reflective structure disposed therebetween; providing a second body having parallel extending second waveguides at said spacing, said second body being polished on one surface with the end faces of the second waveguides lying in the plane of said one surface; assembling the second body on the assembly with the one surface facing the one side and the polished end faces of the second waveguides being in the proximity of the reflective structure to receive light reflected thereby; and joining the second body to the assembly to form the elements so that the light traveling in the first waveguides and reflected by the reflective structure is coupled into the ends of the second waveguides.

The method of the present invention is somewhat more involved with regard to the adjustment than the prior art method. For example, displacement in two linear coordinates and rotational displacement are involved; however, the additional cost with regard to this more complicated adjustment step is less than the cost of the previously now-eliminated and time-consuming critical work steps of polishing the assembled step without destroying the relationship between the waveguides in the two bodies.

The adjustment cost, while assembling the bodies or parts during each of the joining steps can be greatly reduced when each of the bodies is provided with a reference surface which extends parallel to a plane formed by the first and second waveguides in the elements and which reference surface is applyable against a stop face during the steps of assembling or positioning the bodies. The overall adjustment can thereby be reduced to a linear displacement in the axial direction of the cut light waveguide axes which displacement can be controlled by means of microprocessors in an automated process.

Preferably, each of the bodies can be made by providing parallel extending grooves on a surface of a member; securing waveguides in the grooves and then applying a cover member. For the first body, the cover member preferably is substantially a thin layer and may be stripped away or removed subsequent to rejoining the parts to form the assembled structure and prior to positioning the second body thereon. The cover member is preferably removed after the reflective layer has been applied and preferably strips a part of the jacket or cladding of the light waveguide which are preferably glass fibers having a core surrounded by a jacket or cladding. Such a stripping of a portion of the light waveguide will reduce reflection losses. In the manufacture of branching elements and also multi/demultiplexers, the fibers may extend outside of both the first and second bodies. Thus, it is expedient to strip the cover member and if need be the cladding or jacket of the glass fibers only in the central section so that the end section of the cover members remain on the first body. The danger of breaking the light waveguides extending out of the ends of the first body, which exist with the full stripping of the cover member, is thereby greatly reduced or eliminated.

In applications of the waveguide selective filter or of the semi-reflective mirror which generally occurs by means of vapor-deposition, a difficulty often occurs in the branch elements or the multi or demultiplexer elements with fiber tails, which are the fibers that extend beyond the end surfaces of the bodies, being disruptive during these processes. In order to avoid these difficulties, one can proceed by slicing off a portion of each of the first and second bodies adjacent the end surface prior to the steps of polishing and vapor-depositing. Subsequently, these sliced-off portions are again secured onto the body after the assembly step. While the slicing-off and reassembly will affect the transmission losses, these losses are slight.

Each of the bodies preferably employed can be selected from various groups. For example, the body can be composed of a base member on which a plate or layer of etchable material such as an anisotropically etchable material is secured and then V-shaped grooves are then etched into this lamina or layer. In another example, the body can be a glass body or plastically deformable body and the V-shaped grooves can then be mechanically formed by either scratching, sawing, pressing or embossing the grooves in a surface of the body.

It should be noted that after the standard polishing of the various lateral faces of the first and second bodies when assembled into the branch element or the multiplexer elements or the demultiplexer element, only the faces on which either a mirror layer or a filter layer is being vapor-deposited or which contain the fiber end faces need to be polished. In addition, the end faces of the fibers in which plug flanges are to be aligned will need to be polished.

BRIEF DESCRIPTION OF THE DRAWINGS

FIG. 2 being an end view of the first body of FIG. 1;

FIG. 3 illustrating the first body after it has been cut into two partial or sub-bodies;

FIG. 4 illustrating the sub-bodies being reassembled and joined to form the assembly; and FIG. 5 illustrating the assembling and securing of the second body onto the first body to form the element;

FIG. 7 being a side view of the first body after being cut into two parts;

FIG. 8 being a side view of the first body being reassembled to form the assembly; and FIG. 9 being the element with the second body asssembled on the reassembled first body.

DESCRIPTION OF THE PREFERRED EMBODIMENTS

Figure 5:
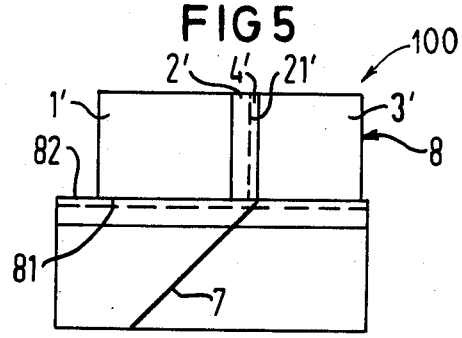
Figure 9:
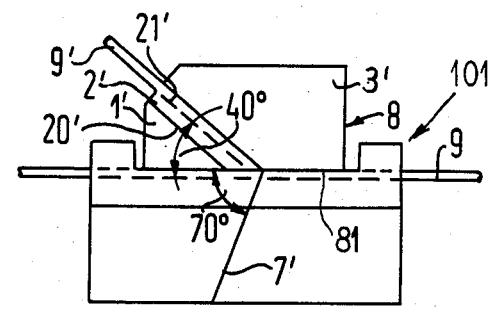

The principles of the present invention are particularly useful for forming an element generally indicated 100 in FIG. 5 or an element generally indicated 101 in FIG. 9, which elements can be branch elements or operate as multi and demultiplexing elements in accordance with a beam divider principle.

Figure 1:
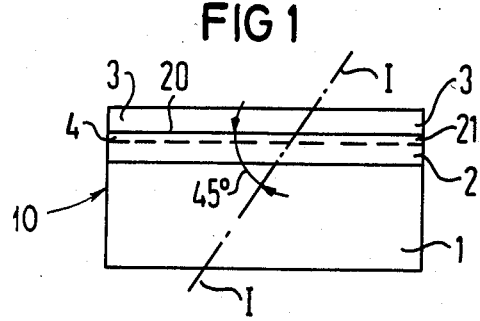
FIGS. 1 through 5 illustrate individual stages of the method in accordance with the present invention for manufacturing a light waveguide branch element or a multi/demultiplexer element without fiber tails and which has been cut on a 45° plane with FIG. 1 being a side view of a first body.
Figure 2:
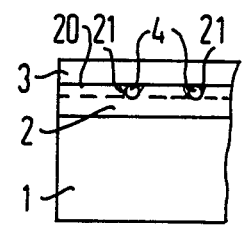
Figure 3:
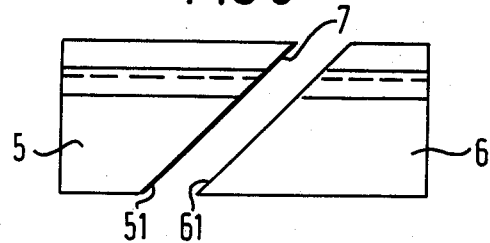
Figure 4:
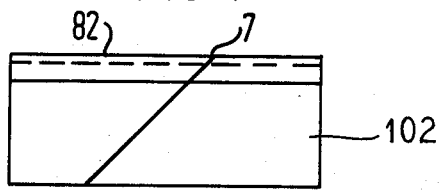

In the embodiment for producing the element 100 of FIG. 5, the method provides in a first step a first body 10 illustrated in FIG. 1 as comprising a base member or supporting body 1, which may be, for example, silica glass and supports a silicon lamina or plate 2, which is secured thereon such as by cement. A plurality of equidistant, V-shaped grooves 21 are produced in a surface 20 of the silicon layer or lamina 2, which surface 20 faces away from the body 1, by means of anisotropic etching with the grooves 21 extending parallel to each other. Light waveguides 4, which are preferably glass optical fibers having a core with either a cladding or jacket surrounding the core are cemented into the grooves 21 and subsequently covered with a lamina or cover member 3 which consist of glass.

The first body 10 is cut along a plane I—I, which extends at an angle of 45° to the axes of the fiber 4 to form two sub-bodies or parts 5 and 6 having cut surfaces or faces 51 and 61. Each of the cut faces 51 and 61 are then ground and optically polished. In the manufacture of a multi/demultiplexer element, the cut can also be expediently carried out an angle of, for example, 70° relative to the fiber axes.

After polishing the cut surfaces 51 and 61, a reflective structure 7, which may be a semi-reflective mirror layer or a filter layer, can be vapor-deposited on one of the two polished cut surfaces 51 or 61, for example, on the cut face 51. If the element 100 is to be used as a multi-/demultiplexer element, the structure 7 needs to be a wavelength selective structure.

Subsequent to providing the structure 7, the two sub-bodies or parts 5 and 6 are reassembled with the axis of the waveguides such as the optical fibers being aligned. When in this position, the two parts are then secured together by cementing to form an assembled member or assembly 102. After forming the assembled member 102, the cover lamina or layer 3 is ground off from the body with the filter and/or reflective structure 7. If desired, a part of the fiber jacket or cladding of each of the fibers 4 can, under given conditions, also be ground off in order to reduce reflection losses. After the grinding step, the surface 82 of the assembly 102 is present.

The next step of the process is to provide a second body generally indicated at 8 which is substantially similar to the first body 10 and has a supporting body or member 1' which has an etchable layer such as a silicon layer 2' cemented thereto. The etchable layer 2' has V-shaped grooves 21' etched therein and waveguides 4' are secured in the grooves 21' such as by cementing and with the assistance of a cover member or body 3'. The second body 8 has a lateral face 81 which has been ground and polished and the end faces of the fibers 4' lie in the plane of this face 81. Thus, the face 81 has been grounded and polished together with the fiber end faces.

After polishing the second body 8, it is then assembled with its polished end face 81 lying on the ground face 82 of the assembly 102 which has the reflective structure 7. The bodies or body and assembly are then adjusted relative to one another so that light coupled out of the fibers 4 of the first body by the reflective structure 7 will be coupled into the fibers 4' of the second body 8. Thus, the end faces of the fibers 4' are in the vicinity of the reflective structure 7 and the fibers 4' are arranged or assembled to be aligned with the fibers 4 of the first body. After the first and second bodies have been positioned, they are cemented or assembled together so that an element 100 of FIG. 5 is created. Subsequent to the joining of the second body on the first body, the external surfaces are polished and ground and the element 100 can then be sawn into individual branch elements, multiplexer elements or demultiplexer elements, by cutting on parallel planes which are parallel to the planes formed by the fibers 4 and 4' with these cutting planes being disposed between the planes of the fibers 4 and 4'.

Instead of the base body consisting of the glass body 1 and a silicon plate or layer 2 cemented thereon, glass bodies and other plastic deformable bodies can be used as the base bodies. The V-shaped grooves can be mechanically formed in a surface of these bodies by being scratched, sawn, pressed or impressed therein.

The method of manufacturing light waveguide branch elements or multi/demultiplexer elements with fiber tails is similar. The manufacturing is explained on the basis of FIGS. 6 through 9 with reference to the example of a demultiplexer 101 being illustrated in FIG. 9.

Figure 6:
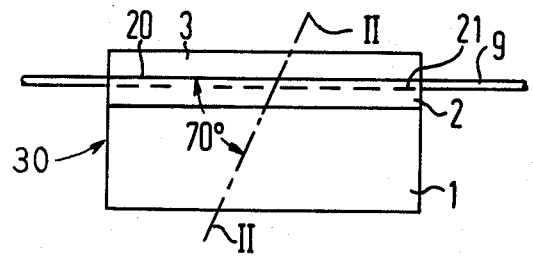
FIGS. 6 through 9 illustrate individual method steps according to the method of the present invention for producing a light waveguide branch element or multi-/demultiplexer element having fiber tails in accordance with the present invention and having a 70° filter with FIG. 6 being a side view of the first body.

As illustrated in FIG. 6, a first body 30 which is substantially similar to the first body 10 of FIG. 1 except that the fibers extend past the ends of the body and thus have tails 9. Thus, the body 30 has a glass supporting body 1 with the layer or lamina 2 of silicon. Grooves 21, which extend parallel to each other with a desired spacing, are etched in the surface 20 of the lamina 2. After forming the grooves 21, the fibers are laid in the grooves and secured by cement and covered by a cover plate such as 3. This completes the formation of the first body 30.

Figure 7:
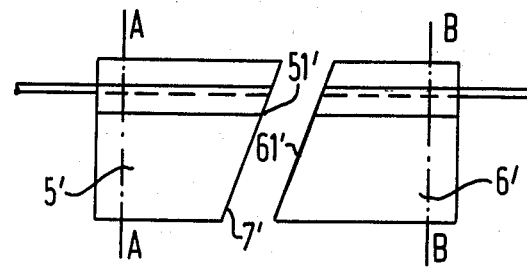
Figure 8:
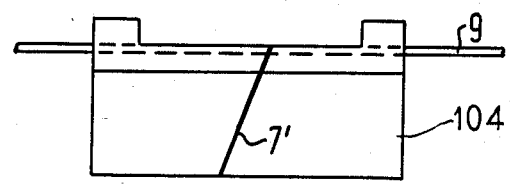

Subsequent to forming the first body 30, it is cut on a plane of II—II which is illustrated extend at an angle of 70° with the axis of the fibers so that the body 30 is cut into two parts 5' and 6' having cut faces 51' and 61' (FIG. 7). A frequency selective filter layer 7' is vapor-deposited onto one of the two ground and polished cut faces such as the cut face 51' and then the two parts 5' and 6' are then reassembled and connected to one another to form the assembly 104 such as illustrated in FIG. 8. It is noted that in reassembling the two parts 5' and 6', care is exercised such as utilizing a lateral stop surface engaging a lateral plane surface so that axial alignment of the fibers of the two bodies is obtained.

Since the fiber tails 9 are disruptive in the accomplishment of the vapor-depositing of the layer or structure 7', the first body 30 can be cut along sections of AA or BB prior to or at the time of the step of cutting on the plane II—II. Then after applying the structure 7' on one of the polished and cut surfaces 51', all of the parts are reassembled relative to each other with the fiber axes being axially aligned. It should be noted that when the body 30 has been cut along the plane AA as well as along the plane BB, then the continued manipulation of the center section by cutting on the plane II—II is substantially the same as the steps illustrated in FIGS. 1 through 5. Subsequently, after the assembly of the second body on the first body as illustrated in FIG. 5, the body sections or parts having the tails 9 which are the parts lying to the left of line AA and the part to the right of BB of FIG. 7 can be assembled with the desired axial alignment of the fibers. Given this method, however, a slight additional coupling loss will occur.

The cover lamina or member 3 of the body with the filter or the mirror structure 7' and at least one additional construction point arising in both instances is ground for the purpose of attaching the second body 8. Because of the danger of breaking the projecting fibers 9, a complete stripping of the cover lamina or plate 3 must, however, be avoided. Thus, as illustrated in FIG. 8, the cover plate 3 is only stripped away in the central segment of the assembly 104 of which the second body is to be placed. Residues or remaining portions of the cover member 3 will remain in the end sections of the body so that the body will have protection for the fibers adjacent the fiber tails 9. A part of the jacket or cladding of each of the fibers can also be removed in the central section while removing the portion of the cover plate 3. The areawise stripping of the cover plate and under certain conditions the fiber jacket can, for example, be accomplished with a fine-grained diamond wheel.

After preparing the reassembled first body or assembly 104 as illustrated in FIG. 8, the second body 8 is positioned with the end faces of its fibers being positioned to receive light reflected by the layer 7'. The second body 8 also has fiber tails 9' which extend out of the body. It is also noted that the surfaces such as the supporting plate 1' and the cover member 3' are arranged so that they form an angle of 40° with the surface 81. The angle of 40° is selected because the laws of reflection and because the 70° angle between the fibers 9 and the filter of the structure 7'.

Although various minor modifications may be suggested by those versed in the art, it should be understood that we wish to embody within the scope of the patent granted hereon, all such modifications as reasonably and properly come within the scope of our contribution to the art.

We claim:

1. A method for manufacturing light waveguide branch elements and multi/demultiplexer elements, which elements operate according to a beam divider principle, said method comprising the steps of providing a first body having parallel extending first light waveguides at a given spacing disposed along one side thereof; cutting said first body along a plane forming an angle with the first waveguide to form two parts; polishing the cut surfaces of each of said parts; applying a reflective structure on one of the polished surfaces, said reflective structure consisting of material selected from a group of materials for forming partial mirrors and for forming filters; reassembling and joining said parts together to form an assembly with the waveguides of each of the parts being axially aligned and the reflective structure disposed therebetween; providing a second body having parallel extending second waveguides at said spacing, said second body being polished on one surface with the end faces of the second waveguides lying in the plane of said one surface; assembling the second body on the assembly with the one surface facing the one side and the polished end faces of the second waveguides being in the proximity of the reflective structure to receive light reflected thereby; and joining the second body to the assembly to complete the formation of the element so that the light traveling in the first waveguides and reflected by the reflective structure is coupled into the ends of the second waveguides.

2. A method according to claim 1, wherein the step of providing the first body includes forming a reference surface on said first body lying in a plane extending parallel to a plane formed by the first and second waveguides of the completed element, said reference surface being engageable by a stop during the step of reassembling and joining said parts to aid in obtaining the axial alignment of the waveguides of the parts.

3. A method according to claim 1, wherein the step of providing the first body comprises providing parallel extending grooves in a base body of said first body, securing first waveguides in said grooves, and covering said waveguides with a cover layer.

4. A method according to claim 3, wherein after the step of reassembling and joining the parts to form the assembly, said method further includes stripping a portion of the cover layer from the assembly to at least expose a portion of each of the first waveguides adjacent the reflective structure prior to assembling the second body thereon.

5. A method according to claim 4, wherein the step of stripping the cover layer only strips the cover layer immediately adjacent the reflective structure for an area the size of the one surface of the second body so that the first waveguides are still protected by said cover layer at a distance away from said second body.

6. A method according to claim 5, wherein the first waveguides are fibers having a core surrounded by a cladding layer and wherein said step of stripping includes stripping a portion of the cladding layer from each fiber.

7. A method according to claim 4, wherein the first waveguides are optical fibers having cores with a surrounding cladding layer and wherein said step of stripping includes stripping a portion of the cladding layer from each fiber.

8. A method according to claim 3, wherein the step of providing said grooves mechanically forms said grooves by scratching, sawing or pressing the grooves in a surface of the base body.

9. A method according to claim 3, wherein the step of forming the base body includes providing a supporting body, securing a layer of etchable material on said supporting body and etching the grooves in said layer of etchable material.

10. A method according to claim 1 which includes prior to the step of applying the reflective structure, cutting the first body along a second plane extending substantially transverse to the axes of the first waveguides to form a third part, and during the step of reassembling and joining the part together, joining the third part onto the other two parts with the waveguides being axially aligned.

* * * * *